(12) United States Patent
Hammar et al.

(10) Patent No.: US 10,528,577 B2
(45) Date of Patent: Jan. 7, 2020

(54) PROVIDING A LIST OF ACTIVITIES TO A USER

(71) Applicant: Apptus Technologies AB, Lund (SE)

(72) Inventors: Mikael Hammar, Lund (SE); Björn Brodén, Malmö (SE); Jonatan Wulcan, Zürich (CH); Bengt Nilsson, Malmö (SE)

(73) Assignee: APPTUS TECHNOLOGIES AB (SE)

( * ) Notice: Subject to any disclaimer, the term of this patent is extended or adjusted under 35 U.S.C. 154(b) by 300 days.

(21) Appl. No.: 15/680,440

(22) Filed: Aug. 18, 2017

(65) Prior Publication Data

US 2018/0060329 A1 Mar. 1, 2018

(30) Foreign Application Priority Data

Aug. 23, 2016 (EP) .................................... 16185313

(51) Int. Cl.
*G06F 16/2457* (2019.01)
*G06F 16/435* (2019.01)
*G06F 16/9032* (2019.01)
*G06F 16/9535* (2019.01)
*G06F 16/9537* (2019.01)

(52) U.S. Cl.
CPC ...... *G06F 16/24578* (2019.01); *G06F 16/435* (2019.01); *G06F 16/90328* (2019.01); *G06F 16/9535* (2019.01); *G06F 16/9537* (2019.01)

(58) Field of Classification Search
CPC .......... G06F 16/24578; G06F 16/9535; G06F 16/90328; G06F 16/9537; G06F 16/435
See application file for complete search history.

(56) References Cited

U.S. PATENT DOCUMENTS

| 7,694,212 | B2* | 4/2010 | Fikes | G06F 16/955 |
| | | | | 715/200 |
| 8,600,981 | B1* | 12/2013 | Chau | G06F 16/9535 |
| | | | | 707/723 |
| 9,147,008 | B2 | 9/2015 | Griffin | |
| 9,292,880 | B1* | 3/2016 | Koorakula | G06F 16/24578 |
| 9,348,480 | B1 | 5/2016 | Chau et al. | |
| 2002/0198882 | A1* | 12/2002 | Linden | G06Q 30/02 |

* cited by examiner

*Primary Examiner* — Jorge A Casanova

(74) *Attorney, Agent, or Firm* — Condo Roccia Koptiw LLP

(57) ABSTRACT

There is provided a method of providing a ranked list of computer-implemented activities to a user. As a performed activity is received, a plurality of lists, which each of the lists defines a ranking of activities, is accessed. The rankings of different lists are calculated with respect to different time horizons. The positions in the lists are associated with scores which are updated in view of the received activity. Also, the rankings of the lists are updated in view of the received activity. The lists are then combined into a single list. The combination is based on the updated lists and the scores associated with the positions in the lists.

20 Claims, 6 Drawing Sheets

302 304 306 308

| Pos | Act | PS | AS |
|---|---|---|---|
| 1 | A | 10 | 17 |
| 2 | F | 9 | 11 |
| 3 | C | 6 | 5 |
| 4 | B | 8 | 3 |
| 5 | E | 4 | 2 |
| 6 | G | 2 | 1 |
| 7 | D | 1 | 1 |
| 8 | H | 1 | 1 |

300a

| Pos | Act | PS | AS |
|---|---|---|---|
| 1 | F | 12 | 12 |
| 2 | C | 8 | 10 |
| 3 | A | 7 | 8 |
| 4 | B | 4 | 6 |
| 5 | G | 4 | 4 |
| 6 | E | 2 | 2 |
| 7 | D | 3 | 1 |
| 8 | H | 1 | 1 |

300b

| Pos | Act | PS | AS |
|---|---|---|---|
| 1 | B | 11 | 14 |
| 2 | C | 10 | 9 |
| 3 | F | 8 | 9 |
| 4 | A | 5 | 6 |
| 5 | E | 3 | 5 |
| 6 | D | 2 | 2 |
| 7 | H | 1 | 1 |
| 8 | G | 1 | 1 |

| Pos | Act | PS | AS |
|---|---|---|---|
| 1 | A | 10 | 17 |
| 2 | F | (10) | 11 |
| 3 | C | 6 | 5 |
| 4 | B | 8 | 3 |
| 5 | E | 4 | 2 |
| 6 | G | 2 | 1 |
| 7 | D | 1 | 1 |
| 8 | H | 1 | 1 |

300a

| Pos | Act | PS | AS |
|---|---|---|---|
| 1 | F | (13) | 12 |
| 2 | C | 8 | 10 |
| 3 | A | 7 | 8 |
| 4 | B | 4 | 6 |
| 5 | G | 4 | 4 |
| 6 | E | 2 | 2 |
| 7 | D | 3 | 1 |
| 8 | H | 1 | 1 |

300b

| Pos | Act | PS | AS |
|---|---|---|---|
| 1 | B | 11 | 14 |
| 2 | C | 10 | 9 |
| 3 | F | (9) | 9 |
| 4 | A | 5 | 6 |
| 5 | E | 3 | 5 |
| 6 | D | 2 | 2 |
| 7 | H | 1 | 1 |
| 8 | G | 1 | 1 |

| Pos | Act | PS | AS | CS |
|---|---|---|---|---|
| 1 | A | 10 | 8.5 | 10 |
| 2 | F | 10 | 6.5 | 20 |
| 3 | C | 6 | 2.5 | 26 |
| 4 | B | 8 | 1.5 | 34 |
| 5 | E | 4 | 1 | 38 |
| 6 | G | 2 | 0.5 | 40 |
| 7 | D | 1 | 0.5 | 41 |
| 8 | H | 1 | 0.5 | 42 |

300a

| Pos | Act | PS | AS | CS |
|---|---|---|---|---|
| 1 | F | 13 | 10 | 13 |
| 2 | C | 8 | 7.5 | 21 |
| 3 | A | 7 | 6 | 28 |
| 4 | B | 4 | 4.5 | 32 |
| 5 | G | 4 | 3 | 36 |
| 6 | E | 2 | 1.5 | 38 |
| 7 | D | 3 | 0.75 | 41 |
| 8 | H | 1 | 0.75 | 42 |

300b

| Pos | Act | PS | AS | CS |
|---|---|---|---|---|
| 1 | B | 11 | 12.6 | 11 |
| 2 | F | 10 | 9.1 | 21 |
| 3 | C | 9 | 8.1 | 30 |
| 4 | A | 5 | 5.4 | 35 |
| 5 | E | 3 | 4.5 | 38 |
| 6 | D | 2 | 1.8 | 40 |
| 7 | H | 1 | 0.9 | 41 |
| 8 | G | 1 | 0.9 | 42 |

PROVIDING A LIST OF ACTIVITIES TO A USER

CROSS-REFERENCE TO RELATED APPLICATIONS

This application claims the benefit of European Patent Convention (EPC) Application No. 16185313.0, filed Aug. 23, 2016, the contents of which are incorporated by reference herein.

BACKGROUND

In the track of digitalisation, activities, such as searching for information or purchasing a product, which were formerly carried out by visiting a certain establishment, are nowadays performed via a computer. For example, instead of visiting a library in order to search for information, a search engine on the internet is used. Similarly, instead of visiting a physical shop for purchasing a product, the purchase is made via an internet shop.

Every day, thousands, millions or even billions of activities are performed online via computer interfaces, such as internet pages presented in a browser. As a result, huge data sets which are indicative of these activities are generated. These data sets may be analysed, for instance for the purpose of spotting trends among the activities. The trends may then be used to predict future activities, i.e., activities which have not yet been carried out. This may of course be of interest from a commercial perspective. However, it is also of interest from a more technical point of view. For example, the predictions may be used for adapting computer interfaces to facilitate performance of future activities.

Returning to the example of search engines above, the predictions could for instance be used to sort the results of a search in a list. The result in the first position in the list should be the result that the user making the search is most likely to choose (in view of what users typically have chosen), the result in the second position in the list should be the result that is the second most likely to be chosen, etc. By presenting the list to the user, the user may easily find what he or she is looking for. Moreover, the user may easily perform his or her next activity, such as browsing to a relevant internet page by clicking a link displayed in connection to the results in the list.

A related example is an auto-complete functionality. As a user types in the beginning of a word or sentence in a browser, a list may be presented to the user with suggestions for how to complete the word or the sentence. Also this list may be a prediction based on an analysis of trends of words and sentences which were previously entered by users.

Yet another example is an internet shop in which a user may be presented with a list of bestselling products from a product selection. The list may be a list of search results in accordance to what was described above, or a list on a category page or any other landing page, or a list of product recommendations on a product page.

Still another example is a list of articles from a digital newspaper or magazine. The list may give a ranking of articles based on which articles were read by readers of the newspaper or the magazine.

In all the above exemplified cases, the display of the list facilitates for a user to carry out a next activity, such as browsing to an internet page associated with an item on the list.

Lists according to the above are widely used on the internet. In order to serve the purpose of assisting a user in performing a next activity, it is important that the list provides an as accurate as possible prediction of the next activity. In other words, it is desirable that the next activity of a user is displayed in the list, and preferably as high up in the list as possible. There is therefore a need to provide a list which, based on past activities, as accurately as possible predicts future activities.

The lists that are used on the internet today are typically generated by a procedure which makes predictions based on trends of past activities with respect to a time horizon. For example, the procedure may work with a sliding time window, and rank the activities based on their occurrence within the sliding time window. With such procedures, the question of how to select the time horizon, i.e., the length of the sliding time window, arises. If a long time horizon is chosen, there is a risk that short but strong trends, so-called micro-trends, are missed. Conversely, if a short time horizon is chosen, long term trends will be missed. This will of course affect the accuracy of the predictions, i.e. the ranking, provided by the list. There is thus room for improvements.

SUMMARY

In view of the above, it is thus an object to mitigate the above drawbacks of the prior art and to provide a ranked list of activities to a user which more accurately predicts a next activity of the user.

According to an exemplary aspect of the disclosed embodiments, the above object is achieved by a method of providing a ranked list of activities to a user, wherein each activity is performable via a computer interface, the method comprising the steps of:

receiving an activity performed via a computer interface at time T, accessing a plurality of lists which each defines a ranking of activities and reflects how frequent each activity has been performed before time T, wherein the ranking of activities of different lists are calculated with respect to different time horizons, updating scores associated with positions of the plurality of lists, wherein, for each list, a score associated with a position of the list is increased with a predefined number in case an activity at the position of the list matches (i.e., is equal to) the received activity, updating the ranking of activities of the plurality of lists based on the received activity and the respective time horizons of the plurality of lists, forming a combined list by selecting an ascending sequence of positions of the plurality of lists, and for each specific position in the ascending sequence:

calculating, for each list, a cumulative score for the specific position by summing all scores associated with positions of the list before and including the specific position of the list, selecting a list among the plurality of lists having a highest cumulative score for the specific position, appending to the combined list all activities at positions before and including the specific position of the selected list which are not yet present in the combined list, wherein activities are appended to the combined list in order of the ranking of the selected list, and providing the combined list to the user via a computer interface.

It is thus proposed to form a list which is a combination, i.e., an ensemble, of a plurality of lists having different time horizons. In this way, the combined list is able to capture trends at different time horizons. For example, the combined list will be able to capture both long term trends and short term trends. As a result, the combined list is able to more accurately predict a next activity of a user. By providing the combined list to a user, the next activity of the user is simplified, e.g., by selecting one of the activities on the provided list.

The plurality of lists and the combined list are updated when an activity is performed via a computer interface. Further, the predictive power of the plurality of lists is updated when an activity is performed via a computer interface. The predictive power of a list is here measured in terms of how often a list historically has been able to predict a next activity. The predictive power of a list is kept track of in terms of scores which are associated with the positions in the list. The score of a position in the list reflects how often historically successful predictions of a next activity were located at that position in the list. The predictive power of the plurality of lists is then used in order to weigh the plurality of lists together.

By activity is generally meant an activity performed via a computer interface, i.e., a computer implemented activity. The computer interface may be a web page shown in a browser on a computer screen. Typically, the activity corresponds to a user input in the computer interface, such as a user typing in text in a field of the computer interface, clicking on a link in the computer interface, or pressing a button in the computer interface. The activity may for instance correspond to making a search, selecting a product, purchasing a product, etc.

The plurality of lists are combined together by considering one position in the plurality of lists at a time, starting from the top of the lists (i.e. position 1 in the lists), and then going downwards in the lists (i.e. in the direction of increasing positions). In other words, positions in an ascending sequence (i.e., increasing sequence) of positions in the plurality of lists are considered, one at a time.

The ascending sequence of positions of the plurality of lists may comprise all positions up to a predefined position. This approach gives highly accurate predictions, in particular in view of the first few positions of the plurality of lists, where scores associated with successive positions in each of the plurality of lists tend to be distinct and have a high variability.

However, further down in the plurality of lists, the variability of the scores associated with successive positions in each list tend to be small. The variability also tends to decrease rapidly with increasing position. One may therefore select the ascending sequence such that the distance between consecutive numbers in the ascending sequence forms an increasing sequence, i.e. the distance becomes larger and larger. For example, the ascending sequence may be an exponentially increasing sequence. More specifically, the ascending sequence of positions of the plurality of lists may comprise positions which are proportional to $2^p$ for all consecutive integers p between zero and k, k being a predefined integer. This is advantageous in that computational power may be saved and that the combined list may be generated and provided to a user faster.

Each of the plurality of lists defines a ranking of activities. A list is hence an ordered list of activities. The order of the activities in a list may be based on scores which are associated with the activities in the list. The activity having the highest score will be first in the list, the activity having the second highest score will be on second place in the order, etc. The activities in a list are hence in the order of decreasing scores.

As a new activity is performed via a computer interface at time T, the rankings of the plurality of lists are updated. In more detail, each activity of a list is associated with a score, and the step of updating the ranking of activities of the plurality of lists may comprise, for each list, updating scores associated with activities in the list based on the received activity and the time horizon of the list, and updating the ranking of activities in the list based on the updated scores associated with the activities in the list. In this way, rankings of the plurality of lists are updated with respect to the activity performed at time T.

There are different approaches for how to update the plurality of lists. According to a first approach, the time horizon of a list may be associated with a temporal decay factor, which has a value which is smaller than one. The temporal decay factor serves as an ageing factor and is hence a measure of the memory of a list. A lower temporal decay factor gives a shorter memory than a higher decay factor. Different lists may have different temporal decay factors, and thereby different temporal memory, i.e., different time horizons. The updating of scores associated with activities in a list may comprise multiplying a score associated with an activity by the temporal decay factor, and, if the activity matches the received activity, followed by increasing the score by the predefined number.

With this approach, the influence in the list of an activity performed at some point in time before time T, decreases exponentially as new activities are performed. The decay is gradual and smooth, and the decay rate is set by the temporal decay factor. Since different lists may have different temporal decay factors, the decay rate is different for different lists. In this way, different lists may be designed to capture trends at different terms, i.e., the lists may stay attuned to trends of different strength.

The time horizon of a list and the associated temporal decay factor may be so related that the time horizon is a number of multiplications by the temporal decay factor needed for a score to be halved. In other words, the time horizon may be the number of activities it takes for the score of any given activity to be halved. Under such circumstances, the time horizon may be referred to as the half-life of a list. Long term trends are identified using lists with long half-lives, whereas short trends are captured by lists with short half-lives.

By way of example, the different time horizons of the plurality of lists may be calculated using different values of r in the formula $c2^r$, wherein c is a constant and r is an integer.

Different activities may be associated with different values. The value may indicate an importance of the activity. For example, if the activity corresponds to purchasing a product, the value may correspond to the price of the product. Alternatively, the value may correspond to a profit made if the product is sold. The predefined number referred to above in connection to updating the scores of the activities and the scores of positions in the plurality of lists, may correspond to a value associated with the received activity. In this way, the activities may be taken into account based on their importance. As a result, the method will be more sensitive to capturing trends of important activities. If all activities are associated with the same value, the predefined number may be set to be equal to one (or another value which is the same for all activities).

The above described approach of updating the plurality of lists is further advantageous in that it allows the lists to be lazily updated. By lazily updated is meant that all scores associated with the activities in the lists do not need to be updated each time a new activity is received. Rather, a score associated with an activity in the list may be calculated later on, on an as-needed basis. For example, it may be the case that a user, in his or her browser, has set a filter such that only a selection of activities should be included in the combined list. In case of a search engine, a user may for instance have set a filter that only search results with images should be shown in the combined list. In the case of an e-shop, the user may have set a filter that only a particular product category should be shown in the combined list. In such cases, it is advantageous to only update scores associated with activities in the selection of activities, thereby saving computational power.

For this purpose, the method may keep track of the total number of activities that has been performed. In particular, the step of receiving an activity performed via a computer interface at time T may comprise updating data indicating a number of activities performed before and including time T.

The method may also keep track of when a score associated with an activity was last updated. More specifically, each specific activity in each list may be associated with data indicating a number of activities performed at a time when the score associated with the specific activity was last updated. A score associated with the specific activity may then be updated using the data indicating a number of activities performed before and including time T and the data indicating a number of activities performed at a time when the score associated with the specific activity was last updated. This allows a score to be updated at a later point in time when it is needed, e.g., when the associated activity is again included in a selection made by a user.

Going in to more detail, the score associated with the specific activity may be updated by multiplying the score associated with the specific activity by the temporal decay factor a number of times, and, if the specific activity matches the received activity, followed by increasing the score by the predefined number, wherein the number of times is equal to the difference between the number of activities performed before and including time T and the number of activities performed at a time when the score associated with the specific activity was last updated.

According to a second approach, the updating of the plurality of lists is based on a sliding window. In more detail, the step of updating ranking of activities of the plurality of lists may comprise using a sliding window procedure for activities performed at or before time T, wherein the different time horizons correspond to different window sizes in the sliding window procedure. A window size may in this context correspond to a number of activities, such as m activities. The sliding window may hence correspond to the m most recent activities.

A sliding window procedure may comprise ranking activities performed at or before time T based on their occurrence frequency during sliding windows having a size corresponding to the different time horizons. The scores associated with a specific activity may hence correspond to how many times the specific activity was performed within the sliding window, such as the occurrence of the specific activity among the m most recent activities.

As mentioned above, the combined list is provided to a computer interface, where it may be displayed to a user. Preferably, the combined list is provided in such a manner that the activities in the combined list are selectable via the computer interface, such as by following a link. In this way, the next activity of a user is facilitated, since he or she may carry out the activity by selecting an activity in the displayed list.

According to an example aspect of the embodiments described herein, there is provided a computer program product comprising a (non-transitory) computer-readable storage medium with instructions adapted to carry out the method of the first aspect when executed by a device having processing capability According to an example aspect of the embodiments described herein, there is provided a system for providing a ranked list of activities to a user, wherein each activity is performable via a computer interface, the system comprising:

an interface component configured to receive an activity performed via a computer interface at time T, a list accessing component configure to access a plurality of lists which each defines a ranking of activities and reflects how frequent each activity has been performed before time T, wherein the ranking of activities of different lists are calculated with respect to different time horizons, a position score updating component configured to update scores associated with positions of the plurality lists, wherein, for each list, a score associated with a position of the list is increased with a predefined number in case an activity at the position of the list matches the received activity, a list updating component configured to update the ranking of activities of the plurality of lists based on the received activity and the respective time horizons of the plurality of lists, a list combining component configured to form a combined list by selecting an ascending sequence of positions of the plurality of lists, and for each specific position in the ascending sequence:

calculating, for each list, a cumulative score for the specific position by summing all scores associated with positions of the list before and including the specific position of the list, selecting a list among the plurality of lists having a highest cumulative score for the specific position, appending to the combined list all activities at positions before and including the specific position of the selected list which are not yet present in the combined list, wherein activities are appended to the combined list in order of the ranking of the selected list, and wherein the interface component is further configured to provide the combined list to the user via a computer interface.

The other exemplary aspects may generally have the same features and advantages as the exemplary aspect described herein. It is further noted that the disclosed embodiments relate to all possible combinations of features unless explicitly stated otherwise.

BRIEF DESCRIPTION OF THE DRAWINGS

The above, as well as additional objects, features and advantages of the present disclosed embodiments described herein, will be better understood through the following illustrative and non-limiting detailed description of preferred embodiments, with reference to the appended drawings, where the same reference numerals will be used for similar elements, wherein:

FIGS. 3a-3e illustrates a plurality of lists and intermediate steps carried out in order to combine the plurality of lists into a combined list according to embodiments.

DETAILED DESCRIPTION

The embodiments will now be described more fully hereinafter with reference to the accompanying drawings, in which embodiments are shown. The systems and devices disclosed herein will be described during operation.

Figure 1:
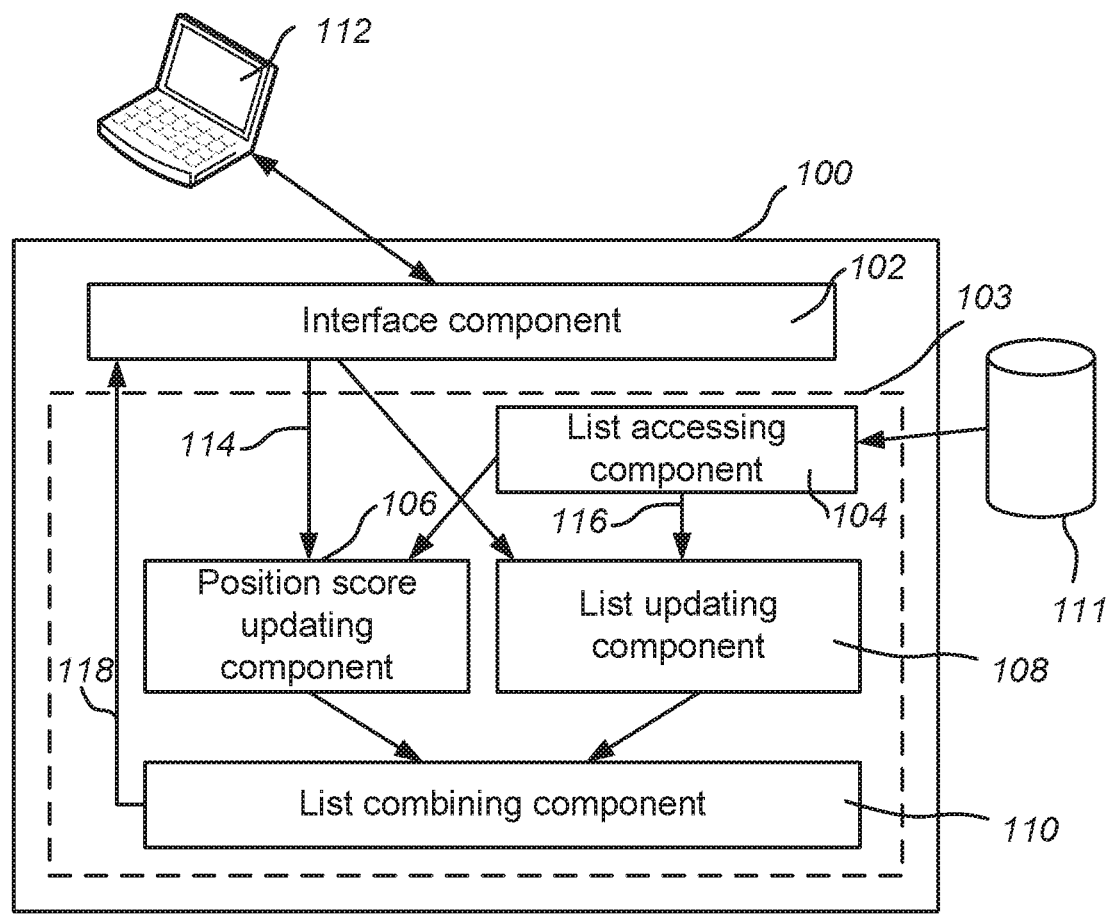
FIG. 1 schematically illustrates a system for providing a ranked list of activities to a user according to an embodiment.

FIG. 1 illustrates a system 100. The system 100 comprises an interface component 102, a list accessing component 104, a position score updating component 106, a list updating component 108, and a list combining component 110.

The interface component 102 may serve as a communication interface towards client computers 112 (only one is shown for illustration purposes). The list accessing component 104, the position score updating component 106, the list updating component 108, and the list combining component 110 form a list generating part 103 of the system.

Figure 2:
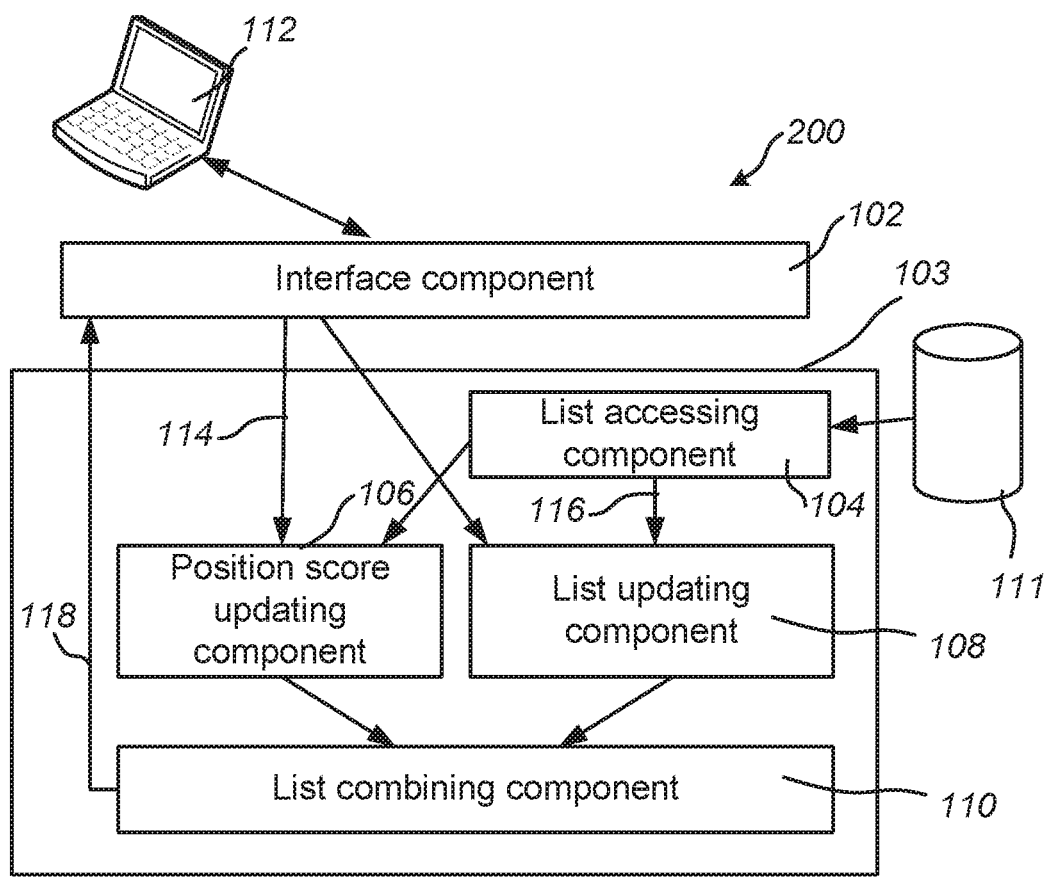
FIG. 2 schematically illustrates a system for providing a ranked list of activities to a user according to an alternative embodiment.

The components 102, 104, 106, 108 and 110 may all be located at the same location, such as in common server or in a common system of servers, as illustrated in FIG. 1. Alternatively, the list generating part 103 of the system may be located at a location which is remote from the interface component 102, as illustrated in FIG. 2. For example, the list generating part 103 of the system may form a cloud-based service which may be called from the interface component 102.

The different components 102, 104, 106, 108, 110, may be implemented in software, hardware or a combination thereof. Generally, the components 102, 104, 106, 108, 110, may be implemented by way of circuitry. Certain components or all components may be implemented as software executed by a processor. A processor may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor described herein may be implemented as hardware or as an application-specific integrated circuit. For example, the system 100 may comprise a (non-transitory) computer-readable medium in which computer code instructions are stored. The system 100 may further comprise a processor and a memory. The processor may, in association with the memory, execute the computer code instructions stored in the computer-readable medium. For example, the processor may access information from, and store data in, any type of suitable memory, such as the non-removable memory and/or the removable memory. The non-removable memory may include random-access memory (RAM), read-only memory (ROM), a hard disk, or any other type of memory storage device. The removable memory may include a subscriber identity module (SIM) card, a memory stick, a secure digital (SD) memory card, and the like. In other embodiments, the processor may access information from, and store data in, memory that is not physically located on the system, such as on a server or a home computer (not shown). When executed, the computer code instructions will cause the processor to carry out any method disclosed herein. In a hardware implementation, the division of tasks between functional components referred to in this description does not necessarily correspond to the division into physical units; to the contrary, one physical component may have multiple functionalities, and one task may be carried out by several physical components in cooperation.

The system 100 is configured to communicate with client computers 112 over a network, which typically is the internet, via the interface component 102. The interface component 102 may be a web server, such as a web front end server. For example, the interface component 102 may be configured to store, process, and deliver web pages to client computers 112. A user may view the web pages, and interact with the web pages, via a computer interface, such as an internet browser, of a client computer 112. The interface component 102 may also receive requests, including activities, from users of client computers 112, process the requests, and return data to the client computers 112. In particular, the interface component 102 may receive data from client computers 112 concerning activities performed by users of the client computers 112, such as an activity performed via a web page. The interface component 102 may save data relating to the activity and forward that data to the list generating apparatus 103 for processing. In return, the interface component 102 receives a ranked list of activities. The interface component 102 may update a web page with the ranked list of activities, and deliver the updated web page to the client computers 112 for display to users via computer interfaces of the client computers 112.

The list generating part 103 of the system may be invoked by the interface component 102. The list generating part 103 may receive data 114 concerning activities performed by users from the interface component 102. Based on that data, the list generating part 103 may update and combine a plurality of lists 116, so as to generate a combined list 118 which is returned to the interface component 102. The plurality of lists 116 may be stored in a memory of the list generating part 103, or in a database 111, and are available to the list accessing component 104.

The operation of the system 100 will be disclosed in the following with reference to FIGS. 1, 2, 3, and the flowchart of FIG. 4.

Users of the client computers 112 will perform activities via a computer interface of the client computer 112. Each time an activity from a certain set of activities, referred to herein as an activity catalog C, is performed, data 114 concerning the activity is received and stored by the interface component 102. The system 100 thus receives a stream of activities from a potentially infinite sequence of activities, one at a time. In particular, in step S02, the communication interface 102 receives an activity performed at time T via a computer interface of a client computer 112. The activity may e.g. be a purchase of a product from a product catalog, entry of a search string in a search engine, or selection of an entry from a list displayed on a web page.

In some embodiments, the communication interface 102 receives a batch (i.e., a plurality) of activities at a time. The batch of activities may correspond to a session, for instance a session of an internet shop, during which the plurality of activities were performed. For example, the batch of activities may correspond to a plurality of items that were purchased at the same time by the same user from an internet shop. In such embodiments, the steps described below are performed after the session is over. It is to be understood that the steps below are performed with respect to all activities in the batch of activities. For example, the list position scores (step S06) and the ranking of the lists (step S08) are updated with respect to all activities in the batch after the session is over.

In step S04, the list accessing component 104 accesses a plurality of lists which are maintained by the system 100. The plurality of lists may e.g. be accessed from the database 111. Typically, the system 100 will maintain about 3-15 lists. In one embodiment, the number of lists is 13. Each list is a ranking of at least k activities from the activity catalog C. The ranking of activities is based on past activities, i.e., activities in the stream of activities before time T.

Each of the plurality of lists is associated with a ranking procedure. The ranking procedure calculates a list which predicts the next activity, i.e. the activity at time T, as well as possible, based on past activities. The ranking of the plurality of lists are calculated with respect to different time horizons, as will be described in more detail later on. The prediction made by the ranking procedures may be formulated in terms of a k-recommendation problem. That problem is that of choosing, immediately before time T, a set of k activities from the activity catalog C such that the probability of one of the k activities is performed at time T is as high as possible.

FIG. 3a illustrates an example with three lists 300a, 300b, and 300c. The three lists of FIG. 3a have different time horizons. For illustration purposes, the first list has a time horizon of 1, the second list has a time horizon of 2.41, and the third list has a time horizon of 6.58. In practice, time horizons in the range 150-500000 may be used. The time is here calculated in terms of the number of activities. Each time an activity is carried out, the time increases by one unit. For instance, the time horizons may be calculated according to $c2^r$, where c is a constant and r an integer. Each list 300a, 300b, 300c, comprises positions 302 (labeled by "Pos"), here positions 1-8. Further, each list 300a, 300b, 300c comprises activities 304 (labeled by "Act"), here activities A-H, associated with the positions 302. By way of example, the list 300a has "A" at its first position, "F" at its second position, etc.

The positions 302 of the lists 300a, 300b, 300c are associated with scores 306 (labeled by "PS"). The scores 306 associated with the positions will be referred to as position scores in the following. The position score 306 of a position in a list is a measure of how often the ranking procedure associated with that list has been able to predict, at that position, a next activity successfully in the past. By way of example, position 1 of the list 300a, has a position score of 10. Thus, the ranking procedure associated with list 300a has made accurate predictions on position 1 ten times in the past. Notably, a position score is only associated with a position in the list, and not with the activity that currently is located at that position in the list.

The activities 304 in the lists 300a, 300b, 300c are associated with scores 308 (labeled by "AS"). The scores 306 associated with the activities will be referred to as activity scores in the following. The activity score 306 of an activity in a list is a measure of how frequent the activity has been performed before time T according to the associated ranking procedure, taking the time horizon into account. By way of example, activity A of the list 300a, has an activity score of 17. In contrast to the position score, an activity score is associated with an activity in the list, and not with the position of the activity in the list. However, as will be described below, the activity scores are used to determine the ranking, i.e. the order, of the activities in a list.

As a new activity is received, the position score updating component 106 updates the position scores 306 of the plurality of lists 300a, 300b, 300c. In more detail, the position score updating component 106 compares the received activity to the activities in each of the plurality of lists 300a, 300b, 300c. If a match is found, i.e., if an activity which is equal to the received activity is found, the position in the list of the matching activity is identified. The position score of the identified position is then increased by a predefined number.

Assume, with respect to the example of FIG. 3a, that the activity received at time T is activity F. In the list 300a, activity F is located at position 2. Therefore, as indicated in FIG. 3b, the position score 306 of position 2 in the list 300a is increased by a predefined number, here by the number one. In the list 300b, activity F is located at position 1. Therefore, as indicated in FIG. 3b, the position score 306 of position 1 in the list 300b is increased by a predefined number, here by the number one. In the list 300c, activity F is located at position 3. Therefore, as indicated in FIG. 3b, the position score 306 of position 3 in the list 300c is increased by a predefined number, here by the number one.

The predefined may be a number which is the same regardless of which activity is received. However, it is also possible that the activities are associated with different values. The value of an activity may for instance correspond to a price of a purchased item. If this is the case, the predefined number may be equal to the value of the received activity. In other words, the predefined number may depend on the received activity.

Next, in step S08 the list updating component 108 proceeds to update the ranking of the plurality of lists 300a, 300b, 300c in view of the received activity. Note that step S08 should always be performed after step S06 (the position scores updated in step S06 should hence be based on lists which have not yet been updated in view of the received activity performed at time T). In order to update the ranking of the plurality of lists 300a, 300b, 300c, the list updating component 108 may first update the activity scores 306 of the plurality of lists 300a, 300b, 300c, and then rank the activities in the order of decreasing activity score.

The updating of the ranking of a list 300a, 300b, 300c, depends on the ranking procedure which is used to calculate the list. As further described above, the ranking procedure constructs a list which predicts the next activity, i.e. the activity at time T, as well as possible, based on past activities. However, different approaches may be used to calculate lists which predict the next activity.

To make predictions, it is common to maintain a buffer of the N most recent activities (including the received activity performed at time T) from which to make predictions. The rationale behind this choice is that older activities will have little impact on the future. Such a buffer is often called a sliding window. According to embodiments, the ranking procedure of one or more of the plurality of lists may be a sliding window procedure. The time horizon of such a sliding window procedure corresponds to the value of N, i.e., the length of the sliding window. With a sliding window procedure, the list updating component 108 sets the activity score of an activity to be equal to the occurrence frequency of the activity within the sliding window. In other words, the activity score is the number of times that the activity occurs in the set of the N most recent activities. Since the plurality of lists have different time horizons, the value of N is different for different lists.

Using sliding windows to maintain recent activities has the drawback that an activity that leaves the window goes from being fully counted to not being counted at all when calculating the list. If k is large, i.e., larger than the window length N, then the activities on positions in the list below the window length are chosen completely arbitrarily, and this causes the hit rate to deteriorate. By hit rate we henceforth mean the number of correct predictions among a sequence of activities divided by the sequence length.

Since it may be of interest to rank any activity in the activity catalog, any window based ranking procedure must have a window size proportional to the catalog size. Such large window sizes have very poor hit rate and cannot catch short term trends.

It is therefore preferred to use another type of ranking procedures, referred to herein as half-life procedures. When half-life procedures are used to calculate the lists, the list updating component 108 updates the activity scores 308 in view of the received activity as described in the following. In order to update an activity score 308 in a list, the list updating component 108 multiplies the activity score 308 of the activity in the list by a temporal decay factor. Further, if the activity matches the received activity, i.e. is equal to the received activity, the activity score is increased by the predefined number (which is the same as for the position scores described above). Thus, since the activity scores are multiplied by the temporal decay factor each time a new activity is received, there will be an exponential decay of the activity scores, unless for the activity which matches the new activity.

The time horizon of a half-life procedure is referred to as the half-life. This is the number of new activities it takes for the score of any given activity to be halved. The temporal decay factor is associated to the half-life. In more detail, the half-life is the number of multiplications by the temporal decay factor needed for an activity score to be halved. Stated differently, the temporal decay factor raised to the power of the half-life is equal to 0.5.

Figure 3D:
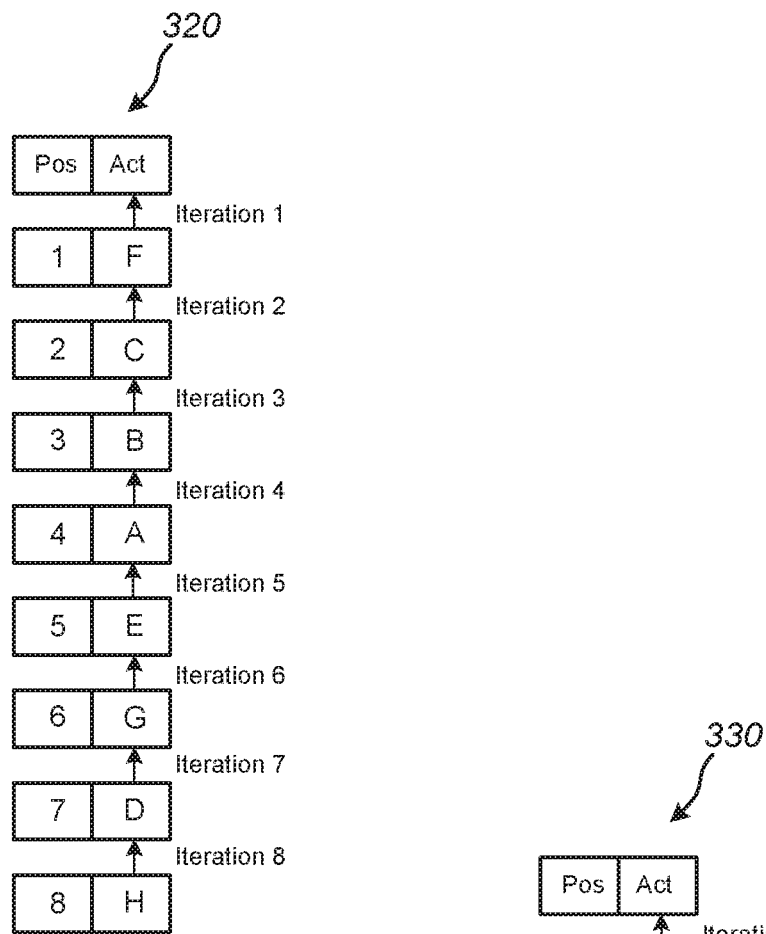
Figure 4:
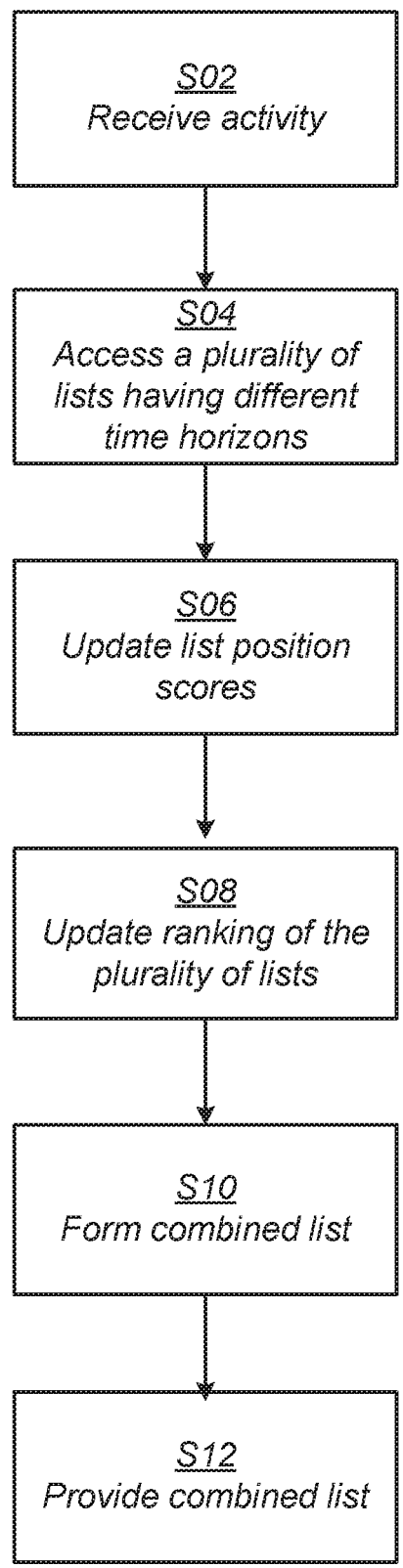
FIG. 4 is a flow chart of a method for providing a ranked list of activities to a user according to embodiments.

Returning to the example of FIG. 3a-3d, the list 300a has a temporal decay factor of 0.5, the list 300b has a temporal decay factor of 0.75, and the list 300c has a temporal decay factor of 0.9. In FIG. 3c, the activity scores of the first list 300a are updated in view of the received activity F. In more detail, all activity scores of the list 300a have been multiplied by 0.5, and then the activity score of activity F has been increased by one. Similarly, the activity scores of the list 300b have been multiplied by 0.75, and then the activity score of activity F has been increased by one. In the list 300c, the activity scores have been multiplied by 0.9, and then the activity score of activity F has been increased by one. As a result, the activity score of activity F in the list 300c has become higher than the activity score of activity C in the list 300c. Therefore, the list updating component 108 will rank activity F higher than activity C in the list 300c.

As described above, the activities may be associated with different values. In that case, the score of the received activity is increased by the value of the activity (instead of the fixed value of one as in the above example).

An advantage of using half-life lists is that they may be lazily updated, meaning that individual activity scores may easily be calculated on an as-needed basis. This may e.g. be advantageous in that the activity scores need not be stored but may be calculated once they are needed. For example, if there is a large activity catalog, but only a selection of the catalog is of current interest, activity scores of activities that are not in the selection need not be updated.

In order to allow the activity scores to be lazily updated, each activity may be associated with data which keeps track on when the activity score was last updated. For example, the data may indicate how many activities that were performed in total when the activity score was last updated. This data is then updated by the list updating component 108 each time that particular activity score is updated. Typically, an activity score is at least updated when that activity was performed by a user. Also, the list updating component 110 may keep track of the total number of activities that have been performed up to now, i.e. by increasing a counter each time an activity is performed. When the lazy updating is done, the activity score is updated by multiplying the activity score by the temporal decay factor a number of times. The number of times is equal to the difference between total number of performed activities and the number of activities performed when the activity score was last updated. Moreover, if the activity whose score is about to be updated is equal to the received activity, the activity score is increase by a predefined number as explained above.

Figure 5:
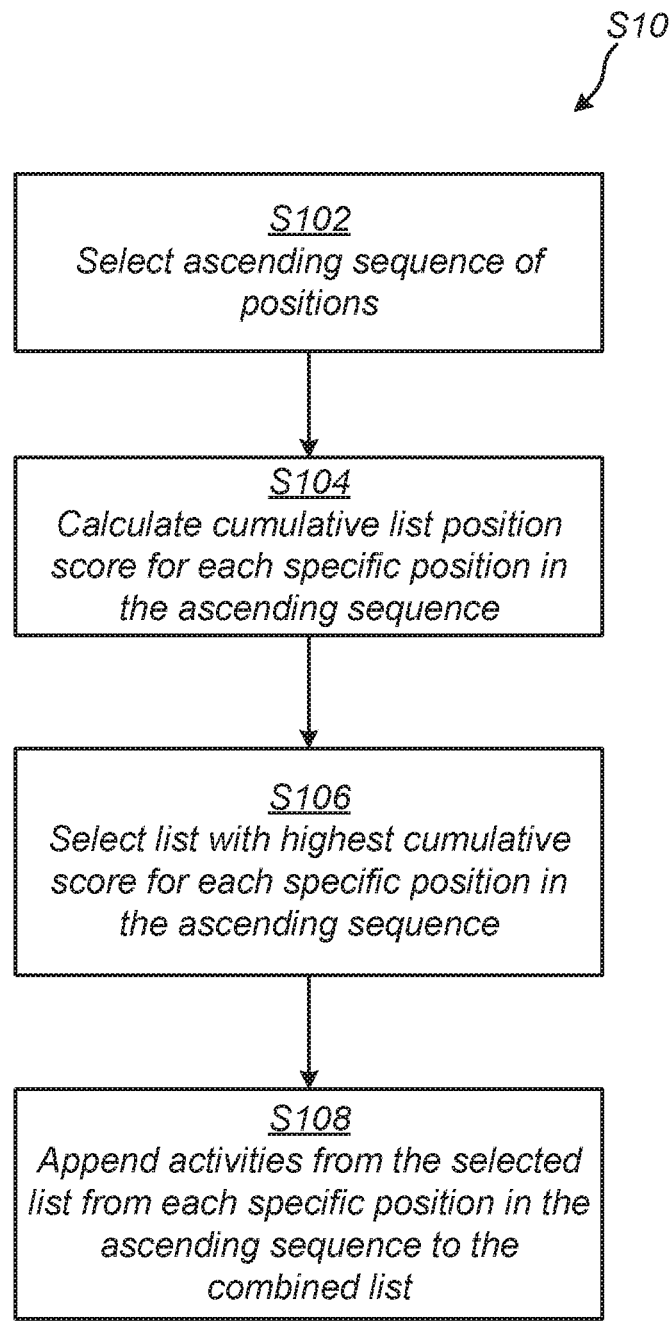
FIG. 5 is a flow chart which illustrates sub-steps of step S10 of FIG. 4.

In step S10, the list combining component 110 combines the plurality of lists 300a, 300b, 300c into a single list, prior to providing, step S12, of the combined list to a user by the interface combining component. Step S10 may be performed in a number of sub-steps as illustrated in FIG. 5. First, in step S102 an ascending sequence of positions may be selected. For example, the ascending sequence may comprise all positions of the plurality of lists 300a, 300b, 300c up to a predefined position. Referring to the example of FIG. 3, the ascending sequence may thus be equal to the sequence of positions 1, 2, 3, 4, 5, 6, 7, 8, or 1, 2, 3, 4.

In some situations, it is preferred for reasons of reducing computational complexity, to use a more sparse ascending sequence of positions. By sparse is here meant that the difference between subsequent elements in the ascending sequence may be larger than one, i.e., that some intermediate positions in the lists are left out from the ascending sequence. In particular, the sparseness of the ascending sequence may be increasing, such that differences between subsequent elements in the ascending sequence itself forms a strictly increasing sequence. For example, the ascending sequence of positions may comprise positions which are proportional to $2^p$ for all consecutive integers p between zero and some predefined integer k. Referring to the example of FIG. 3, such an ascending sequence may be equal to the sequence of positions 1, 2, 4, 8.

Once an ascending sequence has been selected, the list combining component 110 may proceed in an sequential manner to produce a combined list. Initially, the combined list is empty. However, in each sequential iteration the list combining component 110 will append activities to the list as described below. In order to do so, the list combining component 110 considers one position from the ascending sequence at a time, in the order of the ascending sequence. Steps S104, S106, and S108 of FIG. 5 may therefore be repeated for each specific position in the ascending sequence, in the order the specific positions appear in the ascending sequence. As an alternative, step S104 may be performed before the sequential iteration of the ascending sequence. This means that cumulative scores for all positions in the ascending sequence may be calculated before starting the sequential iteration of the ascending sequence.

In the following, it will be described how one iteration of the list combining procedure is performed, i.e., the steps carried out with respect to a specific position in the ascending sequence.

In step S104, a cumulative score CS is calculated for the specific position in the ascending sequence for each of the plurality of lists 300a, 300b, 300c. The cumulative score is an accumulation of the list position scores of positions up to and including the specific position. In FIG. 3c, the cumulative scores 310 of the lists 300a, 300b, 300c are shown. By way of example, position 4 in the list 300a has a cumulative score of 34 which is the sum of the list position scores 306 of positions 1 (with list position score 10), position 2 (with list position score 10), position 3 (with list position score 6), and position 4 (with list position score 8).

Next, in step S106, the list combining component 110 selects the list among the plurality of lists 300a, 300b, 300c having the highest cumulative score for the specific position. By way of example, if the specific position is position 4, the list 300c would be selected since its cumulative score of 35 is higher than the cumulative scores 34 and 32 of the other lists 300a, and 300b.

When a list has been selected for the specific position of the ascending sequence which is currently processed, the list combining component 110 proceeds, in step S108, to append activities to the combined list (i.e., adding activities at the end of the combined list). The list combining component 110 checks which activities in the selected list, at positions before and including the specific position, that have not yet been included in the combined list. All such activities will be appended to the combined list, in the order of appearance in the selected list. In other words, the list combining component 110 does not only consider the activity at the specific position in the selected list, but also activities before the specific position in the selected list. The rationale behind this is that the selected list ranks the activities at positions before the specific position higher than the activity at the specific position. Therefore, these activities should be included in the combined list unless they are already there. It has been found that this improves the performance of the combined list when it comes to predicting the next activity of a user.

A detailed example of how the list combining component 110 may generate the combined list will be described in connection to FIGS. 3c and 3d. In this example, it is assumed that the ascending sequence of positions is equal to 1, 2, 3, 4, 5, 6, 7, 8, i.e., that all positions in the lists are sequentially processed.

The list combining component 110 first creates an empty combined list 320. Then it start the sequential processing by considering position 1 which is first in the ascending sequence of positions. The cumulative scores 310 of position 1 are calculated to be 10, 13, and 11 (equal to the list position scores 306 for position 1) for the lists 300a, 300b, 300c, respectively. Since the list 300b has the highest cumulative score for position 1, the list 300b is selected. The list 300b has activity F at position 1. Further, since this is the first position, there are no activities before activity F in the list 300b. The list combining component 110 will therefore append activity F to the combined list 320.

The list combining component 110 then considers the next position in the ascending sequence, in this case position 2. The cumulative scores 310 of position 2 are calculated to be 20, 21, and 21 for the lists 300a, 300b, 300c, respectively. This is the sum of the list position scores of the first and the second positions of the lists 300a, 300b, 300c. The lists 300b, 300c has the same highest cumulative scores. When this occurs, the list combining component 110 preferably selects the list having the shortest time horizon, in this case the list 300b. In this way, short term trends are given preference over long term trends. The selected list 300b has activity F at its first position and activity C at its second position. Since activity F is already in the combined list but not activity C, the list combining component 110 will only append activity C to the combined list 320.

In the next iteration, the list combining component 110 considers position 3 in the plurality of lists 300a, 300b, 300c. In this case, the list 300c has the highest cumulative score and is therefore selected. The list 300c has activities B, F, C at its first three positions. Of these three activities, F and C are already in the combined list. Therefore, the list combining component 110 will only append activity B to the combined list 320.

Along the same lines, the list combining component 110 will, when processing position 4, select the list 300c and add activity A to the combined list 320. When position 5 is processed, the list 300a is selected and activity E is added to the combined list 320. The list 300a will also be selected when processing positions 6, 7, and 8, whereby activity G is appended to the combined list 320 when processing position 6, activity D is appended to the combined list 320 when processing position 7, and activity H is appended to the combined list 320 when processing position 8.

If a certain length of the combined list is desired, the list combining component 110 may stop the processing when the combined list has reached the desired length.

The processing of the list combining component 110 may be described by the following pseudocode when the ascending sequence comprises all positions up to and including position k, and the desired length of the combined list (the variable "top" in the pseudocode shown in Table 1) is k.

TABLE 1

Figure 3E:
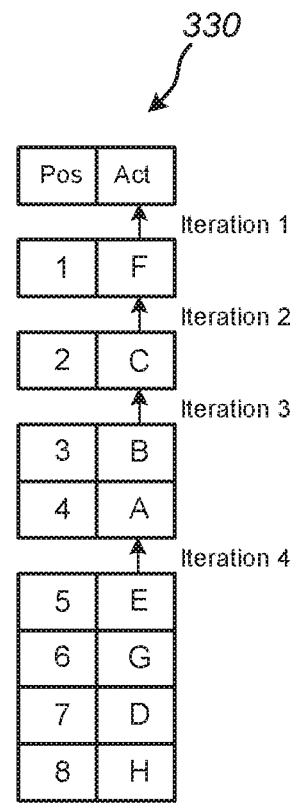

Define the ordered set top:= 0,
for 1 ≤ p ≤ k do
    Find the list $L_l$ with highest cumulative score $S_{lp}$
    for 1 ≤ j ≤ p do
        Let top = top ∪ $L_{lj}$.
        if |top| = k then return top endif
    endfor
endfor
return top Another example is illustrated in FIG. 3e. In that example, the ascending sequence is instead 1, 2, 4, 8 (i.e. $2^0$, $2^1$, $2^2$, $2^3$).

In the first iteration, the list combining component 110 will consider position 1 of the lists 300a, 300b, 300c. The list 300b is selected as having the highest cumulative score, and the activity F on the first position of the list 300b is added to the combined list 330.

In the second iteration, the list combining component 110 will consider position 2 of the lists 300a, 300b, 300c. The list 300b is selected as being the list having the highest cumulative score and the lowest value of the time horizon. Activity C at the second position of the list 300b is added to the combined list 330 (all previous activities in the list 300b are already in the combined list).

In the third iteration, the list combining component 110 will consider position 4 of the lists 300a, 300b, 300c. The list 300c will be selected as having the highest cumulative score at position 4. Activities B, F, C, and A are at positions 1 to 4 of the selected list. Since activities F, and C are already in the combined list 330, activities B and A, in that order, will be added to the combined list 330.

In the fourth iteration, the list combining component 110 will consider position 8 of the lists 300a, 300b, 300c. The list 300a will be selected as having the highest cumulative score at position 4 and the lowest value of the time horizon. The list 300a has activities A, F, C, B, E, G, D, H at its first eight positions. Since activities F, C, B, A are already in the combined list 330, activities E, G, D, H, in that order, will be added to the combined list 330.

Notably, the resulting combined list 330 ended up to be same as the combined list 320 of the previous example. However, this will of course not always be true.

One or more disclosed embodiments may relate to one or more computer interfaces and/or activities that may be performed via one or more user interfaces. For example, the computer interface may be a web page shown in a browser on a computer screen, and the activities may correspond to a user typing in text in a field of the interface, clicking on a link, or pressing a button in the interface. By way of example, the web page may be an internet shop, and an activity may correspond to making a search for a product, selecting a product, purchasing a product, and/or the like.

A user interaction with a computer interface, (e.g., the activity performed via the computer interface) may cause the computer interface to implement an action so as to initiate or perform the activity. For example, as a user clicks on a link on a web page, a request may be sent to a server to load a page associated with the link, or, as a user makes a search on a web page, a request may be sent to the server to carry out the search. The one or more user interactions may result in a computational load in the computer system, such as in a web server, and the more user interactions, the higher the computational load. The computational load in the underlying computer system, such as in a web server, may be reduced if the amount of user interactions via the computer interface is reduced.

The amount of user interactions on a computer interface, and the computational load in the underlying computer system, may be related to how the computer interface is structured and/or presented to the user. For example, suppose that a user wants to buy a novel on an internet bookstore. In order to explore one or more (e.g., all) novels on sale on the bookstore and to find a book that pleases the buyer, the buyer may have to make several searches, click on several links, and/or the like, and causing some load on the web server.

However, by implementing the techniques described herein, one or more lists may be generated and presented to the user so as to reduce the number of searches and/or link selections performed by the user during the search process. The generated lists may be based on previously observed activity and may include shortcuts to novels that the buyer is likely to select. The generation and use of such lists may decreases the total amount of user interactions, and/or the load on the web server may be reduced dramatically. For example when implementing one or more of the embodiments described herein on an internet bookstore, the user interactions relating to search refinements may be reduced (e.g., by 40%). Accordingly, by providing one or more generated lists (e.g., a best-selling list, a related author list, a common bought list, etc.) on the computer interface, the computer interface may be made more efficient in terms of the amount of user interactions, and the computational load in the computer system may be reduced.

Generating a list as a combination of lists defined with respect to one or more different time horizons may further result in increased system efficiency (e.g., reduced load, less processing, etc.). For example, the combined list may adapt to trends in user activities at different time scales, and may impact on the amount of user activity on the computer interface and/or the computational load in the system.

For example, one or more of the disclosed embodiments may be implemented on an internet shop (e.g., online bookstore) using sliding windows with different time scales. When a certain product is in a demand that causes a heavy load on the web server, the users may buy such product by clicking a link in the one or more generated lists (e.g., best-selling list, a related author list, a common bought list, etc.) without having to perform additional clicking or searching by using one or more of the disclosed embodiments (e.g., the generated lists and displayed on the internet shop). The users may mitigate the heavy load on the server and may reduce the computational load.

As described herein, one or more embodiments may decrease computational process and/or load on a computer interface. For example, ordering the sequence of positions of the plurality of lists and/or updating the plurality of lists may provide the list (e.g., combined list) to a user faster and/or in a manner that is more relevant to the user. As described herein, the provided list may be used to accurately predict a next activity of the user. The provided list may be generated and/or provided based on the trends of the user's activities at different time horizons. The generation of such lists may allow the user to avoid performing additional or extraneous searches, instead allowing the user to select one of the activities from the provided list without additional searching. Thus, the provided list may simplify the user activities (e.g., future activities), which may allow results to be ascertained using less computational resources and/or in a smaller amount of time.

If the plurality of the lists are updated using one or more procedures described herein (e.g., the lazy updating procedure), the scores (e.g., all of the scores) on the list may not be stored (e.g., in memory) as the scores may be calculated when they are needed. When the scores on the list are calculated when they are needed, computational power and/or memory usage may be saved.

Other applications and/or programs may use the provided list for other purposes and may be able to save time by using the information from the provided list for effectively aid the user by accurately predicting the future activities by the user.

It will be appreciated that a person skilled in the art can modify the above-described embodiments in many ways and still use the advantages of the embodiments described herein. For example, the above described method is also applicable to other types of lists, which are not based on different time horizons. In other words, the above described method may be used to combine arbitrary lists in order to generate a combined list which gives a better prediction of a next activity in comparison to each of the individual lists.

Thus, the disclosed embodiments should not be limited to the shown embodiments but should only be defined by the appended claims. Additionally, as the skilled person understands, the shown embodiments may be combined.

What is claimed:

1. A method of providing a ranked list of activities to a user, the method comprising:

receiving an activity performed via a computer interface at a time T;

accessing a plurality of lists, where each of the lists defines a ranking of activities and reflects how frequent each of the activities has been performed before the time T, wherein the ranking of activities associated with each of the lists are calculated with respect to different time horizons before the time T;

updating scores associated with positions of the plurality of lists, wherein, for each of the lists, a score associated with a position of the list is increased with a predefined number when an activity at the position of the list matches the received activity;

updating the ranking of activities of the plurality of lists based on the received activity and the respective time horizons of the plurality of lists;

forming a combined list by selecting an ascending sequence of the positions of the plurality of lists, and for each specific position in the ascending sequence:

calculating, for each of the lists, a cumulative score for the specific position by summing all the scores associated with the positions of the list before and including the specific position of the list, selecting a list among the plurality of lists having a highest cumulative score for the specific position, appending to the combined list all the activities at the positions before and including the specific position of the selected list which are not yet present in the combined list, wherein the activities are appended to the combined list in an order of a ranking of the selected list; and providing the combined list to the user via the computer interface, wherein the combined list is provided such that the activities in the combined list are selectable via the computer interface.

2. The method of claim 1, wherein the ascending sequence of the positions of the plurality of lists comprises the positions up to a predefined position.

3. The method of claim 1, wherein each activity of the list is associated with the score, and wherein updating the ranking of activities of the plurality of lists comprises, for each of the list, updating the scores associated with the activities in the list based on the received activity and the time horizon of the list, and updating the ranking of activities in the list based on the updated scores associated with the activities in the list.

4. The method of claim 3, wherein the time horizon of the list is associated with a temporal decay factor, and wherein the updated scores associated with the activities in the list comprises multiplying the score associated with the activity by the temporal decay factor, and if the activity matches the received activity, increasing the score by the predefined number.

5. The method of claim 4, wherein the time horizon of the list that is associated with the temporal decay factor are related that the time horizon is a number of multiplications by the temporal decay factor needed for the score to be halved.

6. The method of claim 3, wherein receiving the activity performed via the computer interface at the time T comprises updating data indicating a number of activities performed before and including the time T;

wherein each specific activity in each of the list is associated with the data indicating the number of activities performed at a time when the score associated with the specific activity was last updated; and wherein the score associated with the specific activity is updated using one or more of the data indicating the number of activities performed before and including the time T and the data indicating the number of activities performed at the time when the score associated with the specific activity was last updated.

7. The method of claim 6, wherein the score associated with the specific activity is updated by multiplying the score associated with the specific activity by a temporal decay factor a number of times, and if the specific activity matches the received activity, increasing the score by the predefined number, wherein the number of times is equal to a difference between the number of activities performed before and including the time T and the number of activities performed at the time when the score associated with the specific activity was last updated.

8. The method of claim 1, wherein updating the ranking of activities of the plurality of lists comprises using a sliding window procedure for the activities performed at or before the time T, wherein the different time horizons correspond to different window sizes in the sliding window procedure.

9. The method of claim 8, wherein the sliding window procedure comprises the ranking activities performed at or before the time T based on their occurrence frequency during sliding windows having a size corresponding to the different time horizons.

10. A non-transitory computer-readable storage medium with instructions adapted to carry a method comprising:

receiving an activity performed via a computer interface at a time T;

accessing a plurality of lists, where each of the lists defines a ranking of activities and reflects how frequent each of the activities has been performed before the time T, wherein the ranking of activities associated with each of the lists are calculated with respect to different time horizons before the time T;

updating scores associated with positions of the plurality of lists, wherein, for each of the lists, a score associated with a position of the list is increased with a predefined number when an activity at the position of the list matches the received activity;

updating the ranking of activities of the plurality of lists based on the received activity and the respective time horizons of the plurality of lists;

forming a combined list by selecting an ascending sequence of the positions of the plurality of lists, and for each specific position in the ascending sequence:

calculating, for each of the lists, a cumulative score for the specific position by summing all the scores associated with the positions of the list before and including the specific position of the list, selecting a list among the plurality of lists having a highest cumulative score for the specific position, appending to the combined list all the activities at the positions before and including the specific position of the selected list which are not yet present in the combined list, wherein the activities are appended to the combined list in an order of a ranking of the selected list; and providing the combined list to a user via the computer interface, wherein the combined list is provided such that the activities in the combined list are selectable via the computer interface.

11. The non-transitory computer-readable storage medium of claim 10, wherein each activity of the list is associated with the score, and wherein updating the ranking of activities of the plurality of lists comprises, for each of the list, updating the scores associated with the activities in the list based on the received activity and the time horizon of the list, and updating the ranking of activities in the list based on the updated scores associated with the activities in the list.

12. The non-transitory computer-readable storage medium of claim 11, wherein the time horizon of the list is associated with a temporal decay factor, and wherein the updated scores associated with the activities in the list comprises multiplying the score associated with the activity by the temporal decay factor, and if the activity matches the received activity, increasing the score by the predefined number.

13. The non-transitory computer-readable storage medium of claim 12, wherein the time horizon of the list that is associated with the temporal decay factor are related that the time horizon is a number of multiplications by the temporal decay factor needed for the score to be halved.

14. The non-transitory computer-readable storage medium of claim 10, wherein updating the ranking of activities of the plurality of lists comprises using a sliding window procedure for the activities performed at or before the time T, wherein the different time horizons correspond to different window sizes in the sliding window procedure.

15. The non-transitory computer-readable storage medium of claim 14, wherein the sliding window procedure comprises the ranking activities performed at or before the time T based on their occurrence frequency during sliding windows having a size corresponding to the different time horizons.

16. A computing device for providing a ranked list of activities to a user, the computing device comprising:
   a memory; and
   a processor configured to:
   receive an activity via a computer interface at a time T;
   access a plurality of lists where each of the lists defines a ranking of activities and reflects how frequent each of the activity has been performed before the time T, wherein the ranking of activities of different lists are calculated with respect to different time horizons;
   update scores associated with positions of the plurality of lists, wherein, for each of the lists, a score associated with a position of the list is increased with a predefined number when an activity at the position of the list matches the received activity;
   update the ranking of activities of the plurality of lists based on the received activity and the respective time horizons of the plurality of lists;
   form a combined list by selecting an ascending sequence of the positions of the plurality of lists, and for each specific position in the ascending sequence, the processor is configured to:
   calculate, for each of the lists, a cumulative score for the specific position by summing all the scores associated with the positions of the list before and including the specific position of the list,
   select a list among the plurality of lists having a highest cumulative score for the specific position,
   append to the combined list all the activities at the positions before and include the specific position of the selected list which are not yet present in the combined list, wherein the activities are appended to the combined list in an order of the ranking of the selected list; and
   wherein the processor is further configured to provide the combined list to the user via the computer interface, wherein the combined list is provided such that the activities in the combined list are selectable via the computer interface.

17. The computing device of claim 16, wherein the ascending sequence of the positions of the plurality of lists comprises the positions up to a predefined position.

18. The computing device of claim 16, wherein the ascending sequence of the positions of the plurality of lists comprises the positions which are proportional to $2^p$ for consecutive integers p between zero and k, wherein k is a predefined integer.

19. The computing device of claim 16, wherein the predefined number corresponds to a value associated with the received activity.

20. The computing device of claim 16, wherein the different time horizons of the plurality of lists are calculated using different values of r in a formula $c2^r$, wherein c is a constant, and r is an integer.

* * * * *